United States Patent
Kinoshita et al.

(10) Patent No.: US 8,169,715 B2
(45) Date of Patent: May 1, 2012

(54) VARIABLE FOCAL LENGTH LENS, AND FOCAL LENGTH ADJUSTING DEVICE, AND IMAGING APPARATUS THAT USE THE SAME

(75) Inventors: Takeshi Kinoshita, Chiba (JP); Koji Yoneda, Chiba (JP); Toshihiro Hirai, Nagano (JP); Takahumi Ogiwara, Nagano (JP); Katsuya Fujii, Nagano (JP)

(73) Assignees: SEIKO Precision Inc., Chiba (JP); Shinshu University, Nagano (JP)

( * ) Notice: Subject to any disclaimer, the term of this patent is extended or adjusted under 35 U.S.C. 154(b) by 373 days.

(21) Appl. No.: 12/064,583

(22) PCT Filed: Aug. 23, 2006

(86) PCT No.: PCT/JP2006/316530
§ 371 (c)(1),
(2), (4) Date: Apr. 27, 2009

(87) PCT Pub. No.: WO2007/023870
PCT Pub. Date: Mar. 1, 2007

(65) Prior Publication Data
US 2009/0303613 A1 Dec. 10, 2009

(30) Foreign Application Priority Data

Aug. 23, 2005 (JP) ................. 2005-241863

(51) Int. Cl.
G02B 15/14 (2006.01)
(52) U.S. Cl. ...................................... 359/694
(58) Field of Classification Search ........... 359/676–694
See application file for complete search history.

(56) References Cited

U.S. PATENT DOCUMENTS
4,989,958 A 2/1991 Hamada et al.
(Continued)

FOREIGN PATENT DOCUMENTS
JP 60-163002 A 8/1985
(Continued)

OTHER PUBLICATIONS

Chang-Wei Chen, et al. *Tunable Micro-Aspherical Lens Manipulated by 2D Electrostatic Forces*, Jun. 5-9, 2005, pp. 376-379, the 13th International Conference on Solid-State Sensors Actuators and Microsystems, Seoul, Korea.

(Continued)

*Primary Examiner* — Ricky Mack
*Assistant Examiner* — Vipin Patel
(74) *Attorney, Agent, or Firm* — Kilpatrick Townsend & Stockton LLP

(57) ABSTRACT

A variable focal length lens, as well as a focal length adjusting device and an imaging device using the same. A variable focal length lens has a lens, a positive electrode, and a negative electrode. A second layer and a first layer constituting the lens are formed from polyvinyl chloride with which a plasticizer has been mixed. The hardness of these layers is adjusted by adjusting the mixing quantity, plasticizer type, etc. The second layer is formed so as so cover at least a light transmission region of the first layer. When a voltage is applied between the positive electrode and the negative electrode, the second layer and first layer are deformed to be pulled to the positive electrode, and thereby the curvature of the variable focal length lens is varied to vary the focal length.

18 Claims, 10 Drawing Sheets

U.S. PATENT DOCUMENTS 5,762,836 A * 6/1998 Bos et al. .................. 264/1.7
7,405,884 B2 * 7/2008 Nishioka et al. ............ 359/665

FOREIGN PATENT DOCUMENTS

| | | |
|---|---|---|
| JP | 62-151824 A | 7/1987 |
| JP | 62-280701 A | 12/1987 |
| JP | 2003-215429 A | 7/2003 |

OTHER PUBLICATIONS

Chinese Office Action for Application No. 2006800308995, dated Jul. 24, 2009, 15 pages total.

Hirai et al., p. 70, Mar. 14, 2002, document in Japanese.

Paxton et al., "An experimental investigation on the development of hydrogels for optical applications," *Polymer Testing*, 22(4):371-374 (2003).

Salehpoor et al., "Electrically Controllable Ionic Polymeric Gels as Adaptive Optical Lenses" vol. 2716, Feb. 26, 1996-Mar. 2, 1996, pp. 36-45, XP002503665.

The extended European Search Report corresponding to the Application No. 06796693.7-2217, date of mailing Nov. 24, 2008, 8 pages total.

European Office Communication of Feb. 1, 2011 in related European Patent Application.

Hirai, Toshihiro, et al., "Study on Autonomous Response Material Composed of Aggregate of Biopolymer and Synthetic Polymer," Sinshu University, Faculty of Textile, Material Development Chemicals, pp. 0055, (Mar. 14, 2002).

Hirai, Toshihiro, et al., "Bending induced by creeping of plasticized poly(vinyl chloride) gel," Proceedings of SPIE, Smart Structures and Materials, Electroactive Polymer Structures and Devices (EAPAD), vol. 5385, pp. 433-441 (2004).

* cited by examiner

VARIABLE FOCAL LENGTH LENS, AND FOCAL LENGTH ADJUSTING DEVICE, AND IMAGING APPARATUS THAT USE THE SAME

TECHNICAL FIELD

The present invention relates to a variable focal length lens whose focal length varies by varying a voltage applied thereto, and to a focal length adjusting device and imaging device using the same.

BACKGROUND ART

The miniaturization of imaging devices is progressing. Imaging devices are primarily composed of a lens and an imaging sensor. In order to form an image of a subject on an imaging sensor in an imaging device, the distance between the lens and the imaging sensor may need to be adjusted depending on the distance between the subject and the imaging device. Conventionally in such cases, the distance between the lens and the imaging sensor is adjusted, for example, by moving a lens coupled to a focal length adjusting device using an actuator such as a motor. However, with this configuration, there is a problem in that the configuration of the focal length adjusting device for moving the lens via the motive power of a motor becomes complex and miniaturizing the imaging device becomes difficult.

In addition, Unexamined Japanese Patent Application KOKAI Publication 2003-215429 discloses a technology wherein the distance between a lens and an imaging sensor is adjusted by moving a lens holder using an actuator composed of an electrostrictive material.

This lens driving mechanism results in a construction that is simpler than that of a lens driving mechanism that uses an electromagnetic motor or similar device. However, guides or springs are needed to control the flexing of the electrostrictive material. For this reason, there are many component parts, and construction remains complex.

Instead of varying the position of the lens, lenses (lens systems) whose focal lengths can be varied are also being used. These types of lens systems comprise a plurality of single lenses. By mutually varying the positions thereof, the focal length of the lens system is varied. However, the configuration whereby the single lenses are moved in order to vary the focal length is identical to that of the above lens driving devices. Consequently, the configuration of conventional lens systems is complex, and focal length adjustment is difficult.

DISCLOSURE OF INVENTION

Problem to be Solved by the Invention

It is an object of the invention to provide a variable focal length lens that is of simple construction and is miniaturizable, as well as a focal length adjusting device and an imaging device using the same. In addition, it is a further object of the invention to provide a lens whose curvature is suitable adjustable, as well as a focal length adjusting device and an imaging device using the same.

Means for Solving the Problem

In order to achieve the above-described object, a variable focal length lens concerning a first aspect of the present invention comprises: a lens, the lens having a first layer formed from a polymer and a second layer determining the curvature of the lens formed from a polymer upon at least a light transmission region of the first layer; a first electrode formed so as to contact the first layer; and a second electrode formed so as to contact the first layer. When a voltage is applied between the first electrode and the second electrode, the first layer and the second layer respectively deform so as to be drawn toward the first electrode, thereby varying the curvature of the lens.

The second layer may also be formed so as to be harder than the first layer.

The first layer and the second layer are formed from a polymer to which a plasticizer has been added. The hardness of the first layer and the second layer may also be varied by varying at least one of the polymer type, the added quantity of plasticizer, or the plasticizer type.

The first electrode and the second electrode may also be formed as a ring shape.

The first electrode and the second electrode may also be configured from a plurality of electrodes divided symmetrically about the optical axis of the lens as a center.

The second layer may also be formed so as to cover the entire light incident surface of the first layer.

In order to achieve the above-described object, a focal length adjusting device concerning a second aspect of the present invention comprises: a lens, the lens having a first layer formed from a polymer and a second layer formed from a polymer upon at least one light transmission region of the first layer, the second layer determining the curvature of the lens; a lens holder that holds the lens; a first electrode provided in a region contacting the lens in the lens holder; and a second electrode provided in a region contacting the lens in the lens holder. The first electrode and the second electrode contact at least the first layer of the lens. When a voltage is applied between the first electrode and the second electrode, the first layer and the second layer respectively deform so as to be drawn toward the first electrode, thereby varying the curvature of the lens and changing the focal length.

The lens holder may also be provided with a planar portion having an aperture, the lens being held in the planar portion.

The first electrode may be formed as a ring shape upon the planar portion, with the second electrode being formed on the inner peripheral surface of the aperture of the planar portion.

The first electrode may also be formed upon one face of the planar portion, with the second electrode being formed on the opposite face of the planar portion so as to cover the aperture of the planar portion, the second electrode furthermore being formed from a material provided with light transmitting properties.

The first electrode and the second electrode may also be configured from a plurality of electrodes divided symmetrically about the optical axis of the lens as a center.

In order to the achieve the above-described object, an imaging device in accordance with a third aspect of the present invention comprises: the focal length adjusting device in accordance with the second aspect; a printed circuit board provided with the focal length adjusting device thereupon; and an imaging sensor disposed upon the printed circuit board.

Effects of the Invention

In the present invention, by using a variable focal length lens that deforms and whose curvature varies according to the voltage applied thereto, it becomes possible to provide a focal length adjusting device that is of simple construction and is miniaturizable, as well as an imaging device using the same.

REFERENCE NUMBERS

Figure 1:
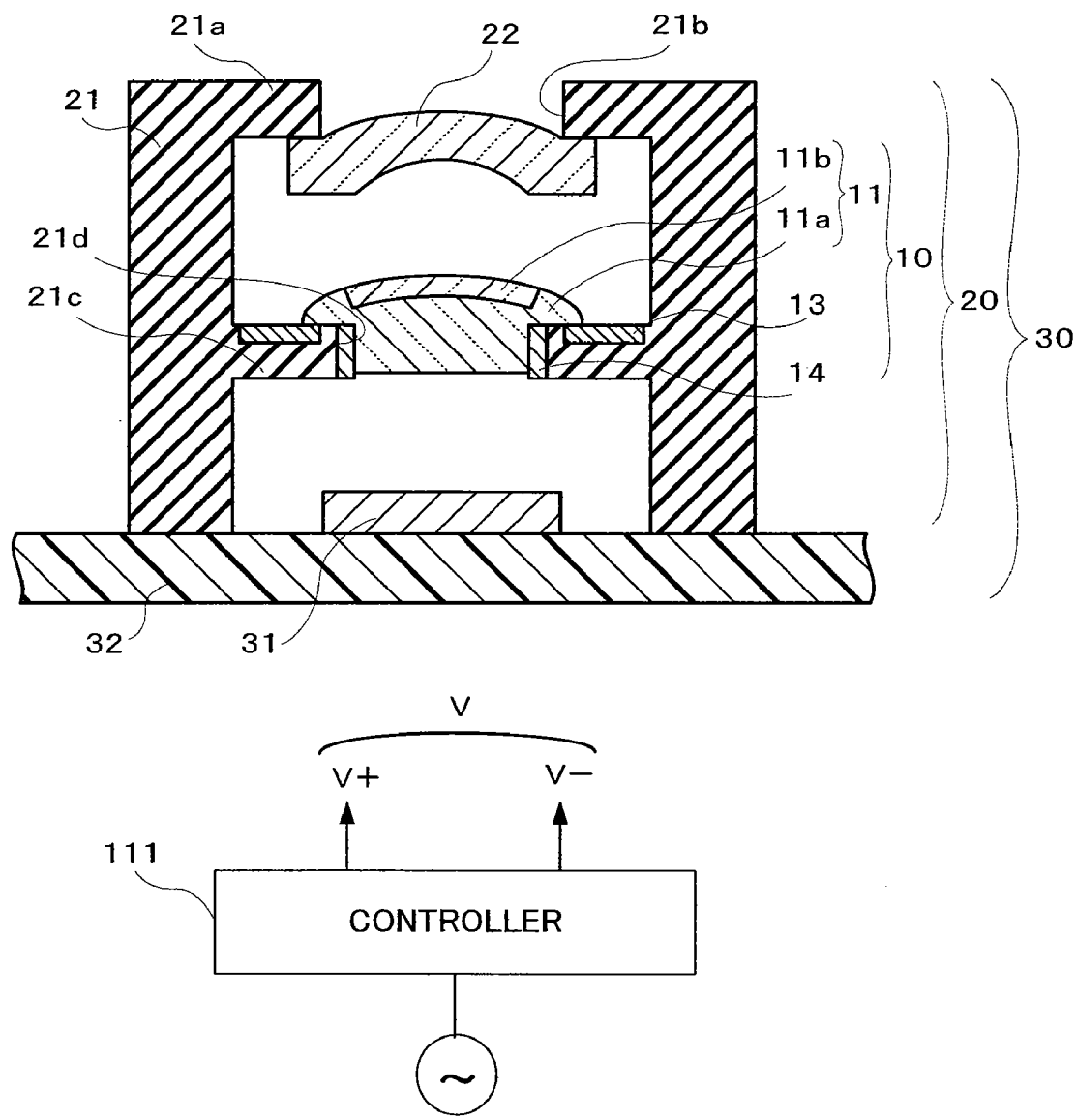
FIG. 1 is a cross-sectional view (taken along the dashed line A-A in FIG. 2) of an imaging device of the first embodiment of the invention.

10: Variable focal length lens
11: Lens
11a: First layer
11b: Second layer
11c: Third layer
13: Positive electrode
14: Negative electrode
20: Focal length adjusting device
21: Lens holder
22: Lens
30: Imaging device
31: Imaging sensor
32: Printed Circuit Board
52: Imaging device
53: Imaging device
62: Focal length adjusting device
63: Focal length adjusting device
80: Variable focal length lens
90: Variable focal length lens
93: Positive electrode
94: Negative electrode
100: Focal length adjusting device
101: Variable focal length lens
111: Controller
112: Controller

BEST MODE FOR CARRYING OUT THE INVENTION

Hereinafter, a variable focal length lens in accordance with the present invention, as well as a focal length adjusting device and an imaging device using the same, will be described with reference to the accompanying drawings.

First Embodiment

An imaging device 30 in accordance with the first embodiment of the present invention will now be described with reference to FIGS. 1 to 4.

The imaging device 30 in accordance with the first embodiment of the present invention is provided with a focal length adjusting device 20, an imaging sensor 31, and a printed circuit board 32, as shown in cross section in FIG. 1.

The imaging sensor 31 converts an optical image of a subject into an electrical signal. The imaging sensor 31 is constructed from a CCD (charge-coupled device) or CMOS (complementary metal oxide semiconductor) or other image sensor. The imaging sensor 31 is provided upon the printed circuit board 32.

The focal length adjusting device 20 is provided with a variable focal length lens 10, a lens holder 21, and a lens 22.

As shown in FIGS. 1, 4(a), and 4(b), the variable focal length lens 10 is provided with a lens 11a positive electrode 13 and a negative electrode 14. The lens 11 is provided upon the surface of a planar portion 21c of the lens holder 21 that faces a planar portion 21a. The lens 11 comprises a first layer 11a, and a second layer 11b provided upon the first layer 11a.

Both the first layer 11a and the second layer 11b are formed from a polymer that deforms in response to the application of voltage. In the present embodiment, these layers are formed from polyvinyl chloride to which a plasticizer has been added. As described below, the polyvinyl chloride and the plasticizer are determined from the desired amount of displacement, strength, etc., for the respective layers. For example, the polyvinyl chloride and the plasticizer may be mixed in a ratio of 1:9 (polyvinyl chloride: plasticizer).

The first layer 11a is provided contacting the positive electrode 13 and the negative electrode 14 formed on the planar portion 21c of the lens holder 21. The second layer 11b is formed adhering to the first layer 11a, so as to cover at least a light transmission region on one face (the face facing the side of the lens 22, i.e., the light incident face) of the first layer 11a. The second layer 11b determines the curvature of the lens 11. In addition, the second layer 11b is formed such that variation in the lens curvature is less than that of the case wherein the entire lens is composed of the first layer 11a. The second layer 11b is also formed having hardness to the degree that a protective membrane for the variable focal length lens 10 is unnecessary.

Figure 2:
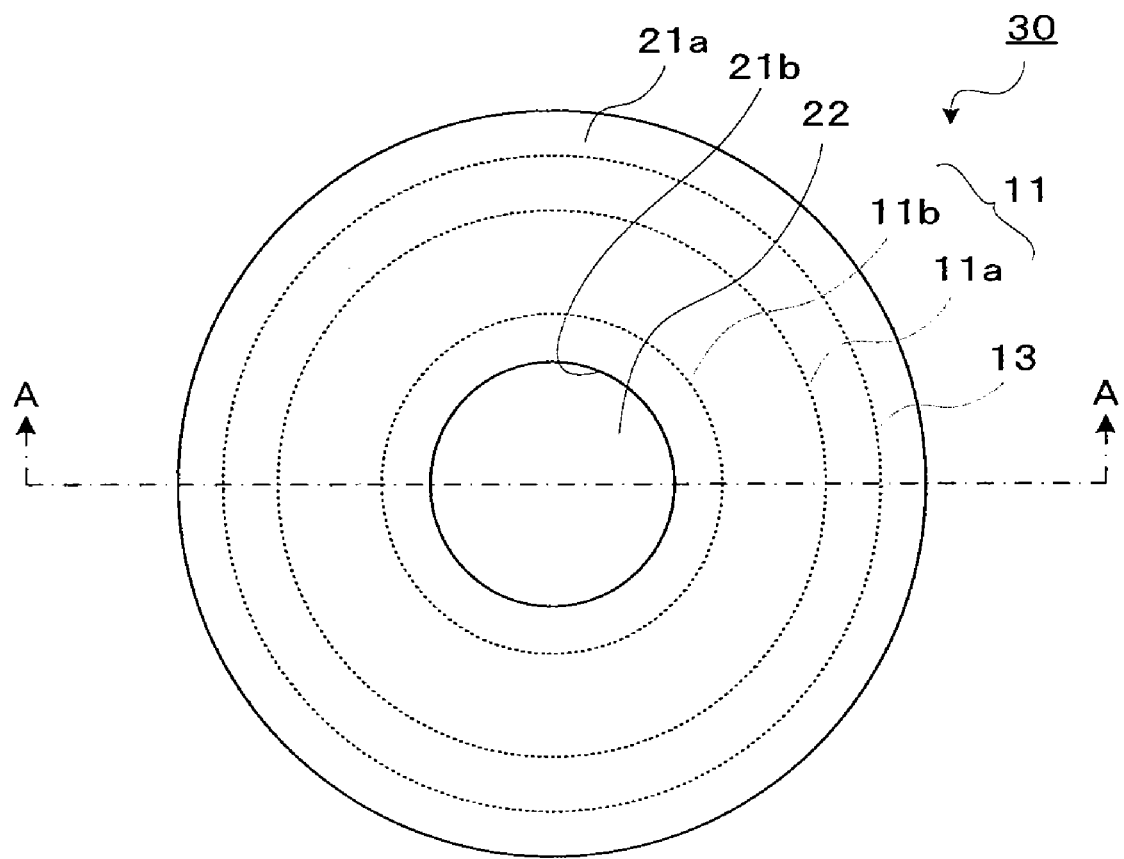
FIG. 2 is a plan view of an imaging device of the first embodiment of the invention.
Figure 3:
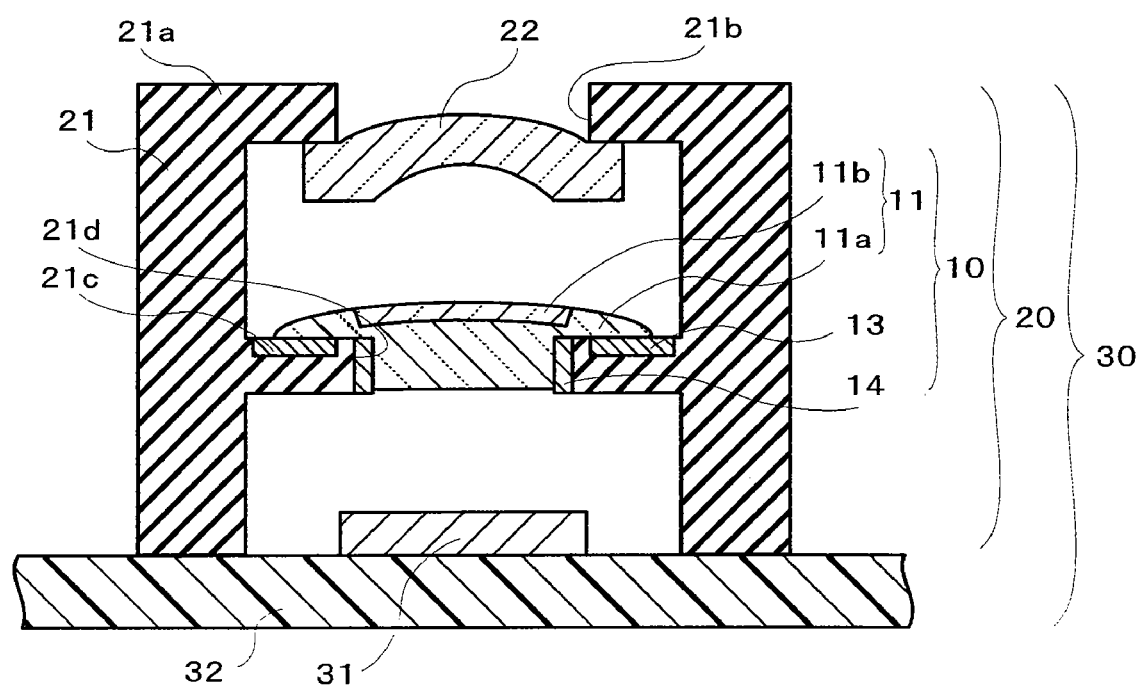
FIG. 3 is a cross-sectional view schematically showing the state wherein a voltage has been applied to a variable focal length lens provided in a focal length adjusting device that constitutes an imaging device of the first embodiment of the invention.

The lens 11 is formed such that its shape when the voltage applied to the positive electrode 13 and the negative electrode 14 is zero, i.e., its shape in the initial state, is that of a ring shape, as shown in FIG. 2. When the voltage applied to the positive electrode 13 and the negative electrode 14 is raised from zero, the first layer 11a constituting the lens 11 deforms along the positive electrode 13, as shown in FIG. 3. In addition, the second layer 11b also deforms so as to be drawn toward the positive electrode 13. In so doing, the curvature of the lens 11 changes, and thus the focal length changes.

The hardness of the first layer 11a and the second layer 11b constituting the lens 11 is determined according to the polymerization of the polyvinyl chloride used, the mixing quantity of plasticizer, and the properties of the plasticizer used. For this reason, the hardness of the first layer 11a and the second layer 11b is determined by appropriately adjusting these parameters according to the desired properties of the first layer 11a and the second layer 11b.

More specifically, consider for example the degree of polymerization of polyvinyl chloride. Upon comparing polyvinyl chloride samples with polymerization degrees of n=1100 and n=3700, the polyvinyl chloride with n=3700 is, for example, stronger and more plasticizer can be added thereto. However, this polyvinyl chloride has a transparency that is low compared to the polyvinyl chloride with n=1100. Consequently, in this case, the polyvinyl chloride with n=1100 is more preferable for use as the variable focal length lens 10. Next, the plasticizer is preferably an phthalic acid ester. More particularly, dibutyl phthalate (DBP), di-2-ethylhexyl phthalate (DEHP(DOP)), di-n-octyl phthalate (DnOP), di-isononyl phthalate (DINP), di-isodecyl phthalate (DIDP), and di-undecyl phthalate (DUP) are preferable. Typically, as the quantity of these plasticizers added to polyvinyl chloride is increased, the polyvinyl chloride gel becomes more flexible, and exhibits a tendency of increased amount of displacement when a voltage is applied. In addition, as the linear chains of the ester groups become longer for each of these plasticizers, the polyvinyl chloride exhibits a tendency of decreased amount of displacement when a voltage is applied. Moreover, in the case where the ester groups are branching, the polyvinyl chloride exhibits a tendency of little amount of displacement when a voltage is applied.

Consequently, by utilizing these properties, the properties and mixing quantity of plasticizer are appropriately adjusted according to the desired amount of displacement, strength, etc., by the variable focal length lens. For example, if a particularly large amount of displacement is sought for the variable focal length lens 10, it is necessary for a flexible gel to be produced. In order to do so, the mixing quantity of plasticizer can be increased, a plasticizer having short linear chains of ester groups may be used, a plasticizer with a low degree of branching of ester groups may be used, etc. By using one or a combination of the above, the hardness of the gel is adjusted.

In addition, the first layer 11a and the second layer 11b constituting the lens 11 are formed in the following way. First, a plasticizer such as di butyl phthalate is added to polyvinyl chloride. This mixture is then dissolved in tetrahydrofuran (THF). Subsequently, this solution is poured into a mold that has been formed in advance in the shape of the variable focal length lens 10, and left for several days. Left in the mold, the tetrahydrofuran evaporates; hence a gel lens is formed.

As shown in FIG. 1, the positive electrode 13 is formed upon the face of the planar portion 21c of the lens holder 21 that faces the planar portion 21a. As shown in FIG. 2, the positive electrode 13 is formed in a ring shape. The positive electrode 13 may be formed, for example, from inorganic conducting materials such as carbon black, gold, silver, aluminum, and phosphor bronze, or from organic conducting materials such as organic conducting polymers.

The negative electrode 14 is formed in a ring shape so as to cover the inner peripheral surface of the aperture 21d formed on the planar portion 21c of the lens holder 21. The negative electrode 14 is also be formed, for example, from inorganic conducting materials such as carbon black, gold, silver, aluminum, and phosphor bronze, or from organic conducting materials such as organic conducting polymers.

In addition, the positive electrode 13 and the negative electrode 14 are connected to a controller 111. The controller 111 controls a voltage V applied between the positive electrode 13 and the negative electrode 14 in accordance with an exteriorly provided control signal.

By applying a voltage V between the positive electrode 13 and the negative electrode 14, the lens 11 is drawn toward the positive electrode 13 and deforms along the positive electrode 13. The drawing strength (degree of deformation) roughly increases as the applied voltage increases. In the first embodiment, the positions of the positive electrode 13, the negative electrode 14, and the edge of the lens 11 exist in the positional relationship shown in FIGS. 1 and 2. For this reason, when the voltages V+ and V− are respectively applied to the positive electrode 13 and the negative electrode 14, the lens 11 deforms radially outward (elongation).

Figure 4:
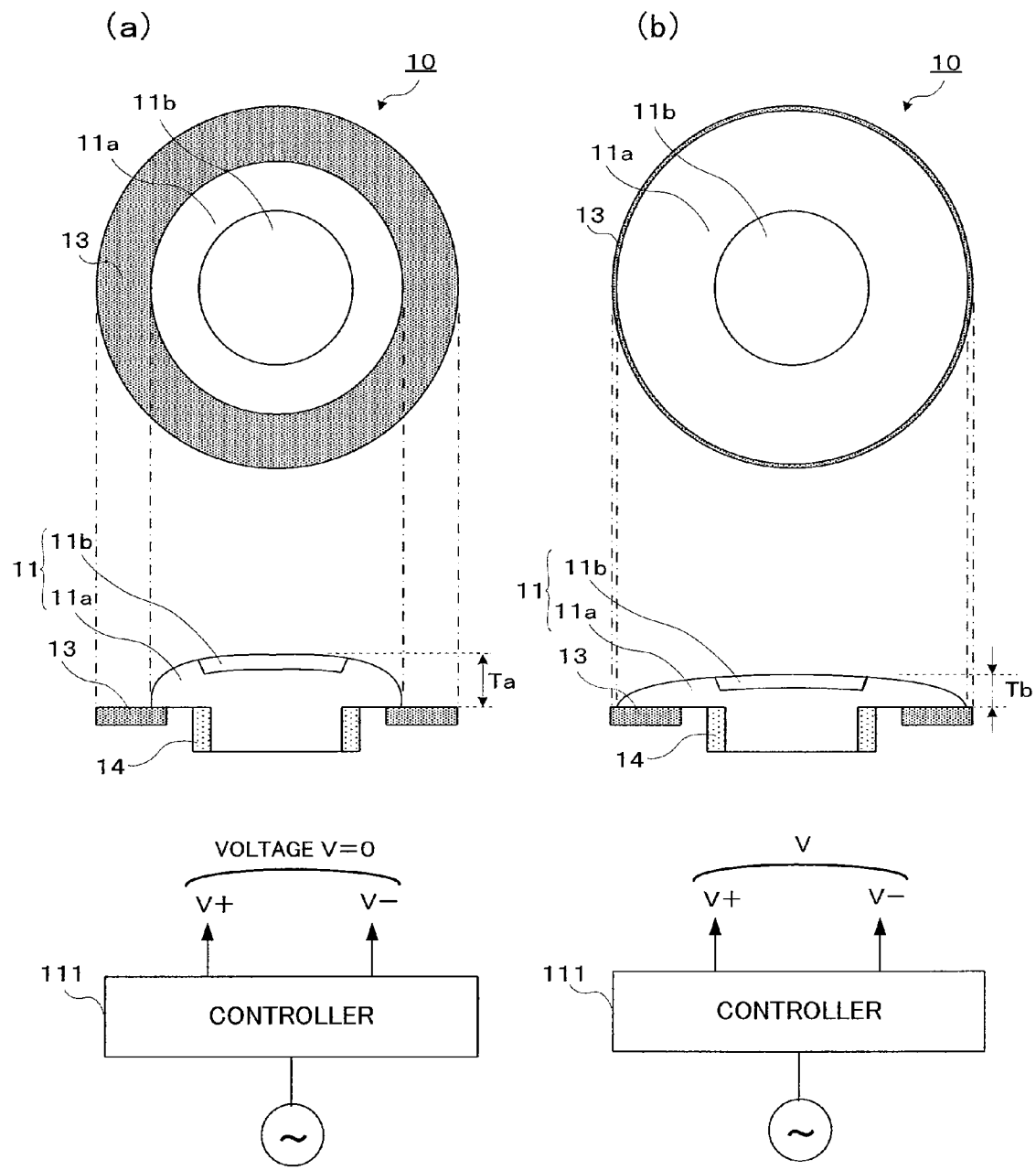
FIG. 4(a) schematically shows the operation of a variable length focal lens of the first embodiment of the invention.
FIG. 4(b) schematically shows the operation of a variable length focal lens of the first embodiment of the invention.

Next, the operation by which the variable focal length lens 10 varies its focal length will be described using FIG. 4. In the initial state wherein the voltage V applied between the positive electrode 13 and the negative electrode 14 is zero, the first layer 11a of the lens 11 contacts the negative electrode 14, and the peripheral edge thereof contacts the positive electrode 13, as shown in FIG. 4(a).

When the voltage applied to the positive electrode 13 and the negative electrode 14 is raised from zero, the polyvinyl chloride constituting the first layer 11a and the second layer 11b of the lens 11 is drawn toward the positive electrode 13. In so doing, the first layer 11a and the second layer 11b are deformed radially outward (elongation) so as to cover the positive electrode 13, as shown in FIG. 4(b). As the radius of the lens 11 increases, the thickness of the lens 11 decreases from Ta to Tb (thinning). Due to the voltage applied between the positive electrode 13 and the negative electrode 14, the second layer 11b is also deformed radially outward (elongation), and the thickness of the second layer 11b becomes thinner. For this reason, the radius of curvature of the second layer 11b becomes larger. In other words, the curvature of the lens 11 becomes smaller, and thus the focal length of the lens 11 becomes more distant.

In the second layer 11b, a mixing quantity of plasticizer that is small in advance, and/or a plasticizer with a small amount of displacement is used. For this reason, when a voltage is applied between the positive electrodes 13 and 14, the degree to which the second layer 11b is drawn toward the positive electrode 13 is small compared to that of the first layer 11a. On the other hand, the first layer 11a is strongly drawn and greatly deformed. However, since the first layer 11a and the second layer 11b are formed from nearly identical materials and only differ in the mixing quantity, type, etc., of plasticizer, both layers have excellent adhesion. Consequently, even when there is a difference between the first layer 11a and the second layer 11b with regard to the degree of deformation as described above, detachment of the interface of the layers, introduction of air, etc., do not occur, and the layers provide excellent light transmission properties.

In addition, when the voltage applied to the positive electrode 13 and the negative electrode 14 is returned to zero, the polyvinyl chloride constituting the first layer 11a and the second layer 11b cease being drawn toward the positive electrode 13, and thus the lens 11 returns to the initial state shown in FIG. 4(a).

The lens holder 21 is cylindrically shaped, as shown in FIGS. 1 and 2, and holds the variable focal length lens 10 as well as the lens 22 on the inner side thereof. In addition, the lens holder 21 is provided with a planar portion 21a and a planar portion 21c. The planar portion 21a has an aperture 21b corresponding to the diameter of the lens 22. The planar portion 21c is provided with an aperture 21d corresponding to the variable focal length lens 10. In addition, the positive electrode 13 is formed upon the surface of the planar portion 21c that faces the planar portion 21a, and the negative electrode 14 is formed spanning the entire inner peripheral surface of the aperture 21d of the planar portion 21c. In this way, the positive electrode 13 and the negative electrode 14 are formed on the planar portion 21c of the lens holder 21. Consequently, it is preferable that at least the planar portion 21c of the lens holder 21 be formed from an insulating material, specifically being formed from PET (polyethylene terephthalate).

The lens 22 is configured of a plastic lens, glass lens, or other lens, and in conjunction with the variable focal length lens 10, focuses the light of an optical image of a subject.

The variable focal length lens 10 varies in curvature according to the voltage applied between the positive electrode 13 and the negative electrode 14, as described above. On the other hand, the curvature of the lens 22 is fixed.

The variable focal length lens 10 of the first embodiment is provided with a lens 11 comprising a second layer 11b and a first layer 11a. In addition, a controller 111 controls a voltage V applied between electrodes 13 and 14. The curvature of the lens 11 is easily controlled by the application of voltage of controller 111. The curvature of the lens 11 is determined by the lens surface. For this reason, it is necessary that the deformation of the surface of the lens 11 is controlled, in order to obtain a set degree of variation in the curvature of the lens 11. However, if the entirety of the lens 11 is formed with the same hardness, the degree of deformation changes greatly due to voltage applied between the electrodes 13 and 14, as a result of minute differences in shape, etc., of the lens 11. For this reason, it is difficult to control the shape of the surface of the lens 11, i.e., the curvature of the lens 11.

However, since a second layer 11b is provided on a surface region determining the curvature of the lens 11, it is possible to control only the shape of the second layer 11b. In so doing, it is possible to control the curvature of the lens 11. Consequently, other regions, i.e., the amount of displacement of the first layer 11a, etc., do not significantly affect the curvature of the lens 11. For this reason, the curvature of the lens 11 is easily controlled.

In addition, in the case where the lens constituting the variable focal length lens is formed of a single layer, it is necessary to cover the lens surface with a thin film having flexibility, such as polyurethane, poly-paraxylene resin (parylene), etc., in order to protect the surface of the lens from the exterior environment. However, since the protective film and the lens are of different materials, adhesion is poor. For this reason, when the lens deforms, there is the problem in that gaps developing between the protective film and the lens. Consequently, when curvature is controlled by deforming the lens, there has been the problem of the difficulty of accurately controlling curvature without developing gaps, etc. However, as a result of the second layer 11b being formed as in the first embodiment, the lens surface is resistant from being affected by the exterior environment. For this reason, the protective film that was necessary in the case wherein the lens is formed of a single layer can be omitted.

As described above, by applying a voltage to the variable focal length lens 10 of the first embodiment, the lens 11 itself deforms, and as a result, the curvature thereof changes, and thus the focal length changes. Consequently, unlike the conventionally used configuration wherein focal length is adjusted by an actuator, etc. moving a lens holder holding a lens along the optical axis, the actuator, the power transmission means, guides, etc., can be omitted. As a result, the focal length adjusting device 20 can be miniaturized, and furthermore the imaging device 30 can be easily adapted for miniaturization.

Second Embodiment

Figure 5:
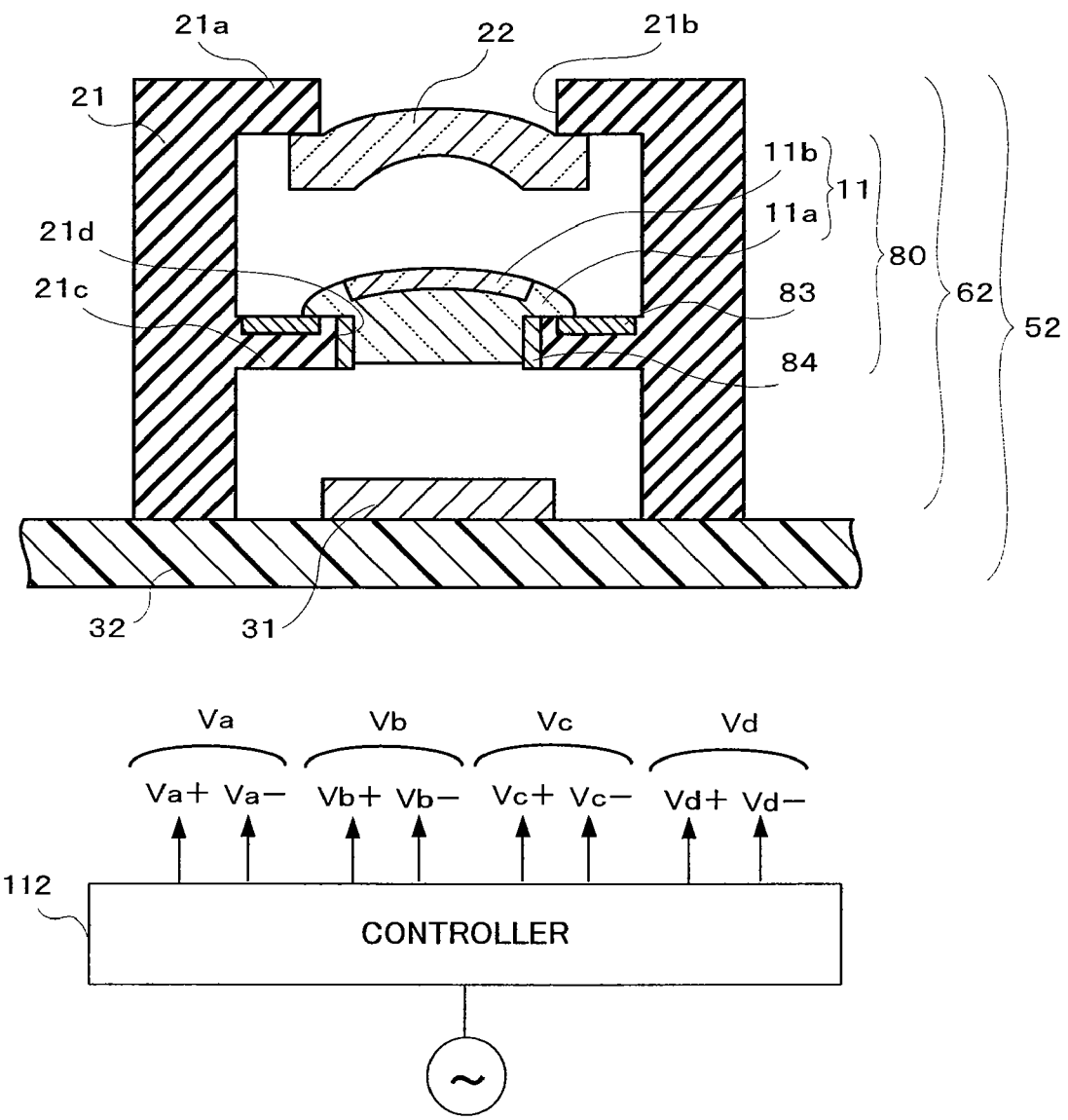
FIG. 5 is a cross-sectional view (taken along the dashed line B to B in FIG. 6) of an imaging device of the second embodiment of the invention.

An imaging device 52 of the second embodiment of the present invention will now be described with reference to FIGS. 5 and 6. A variable focal length lens 80 in accordance with the second embodiment differs from the variable focal length lens 10 of the first embodiment in that the number and shape of the positive electrode and negative electrode are different from that of the positive electrode and negative electrode of the first embodiment. The portions in the second embodiment that are common to first embodiment are referred to using identical reference numbers.

The imaging device 52 of the second embodiment is provided with a focal length adjusting device 62, an imaging sensor 31, and a printed circuit board 32. The focal length adjusting device 62 is provided with a variable focal length lens 80, a lens holder 21, and a lens 22.

Similarly to the first embodiment, the variable focal length lens 80 comprises a lens 11, a positive electrode 83, and a negative electrode 84.

Similarly to the first embodiment, the first layer 11a and the second layer 11b constituting the lens 11 are formed from polyvinyl chloride to which a plasticizer has been added. The second layer 11b is formed harder than the first layer 11a by a set degree, and additionally is formed so as to cover at least a light transmission region upon the first layer 11a. Thus, the second layer 11b determines the curvature of the lens 11.

Figure 6:
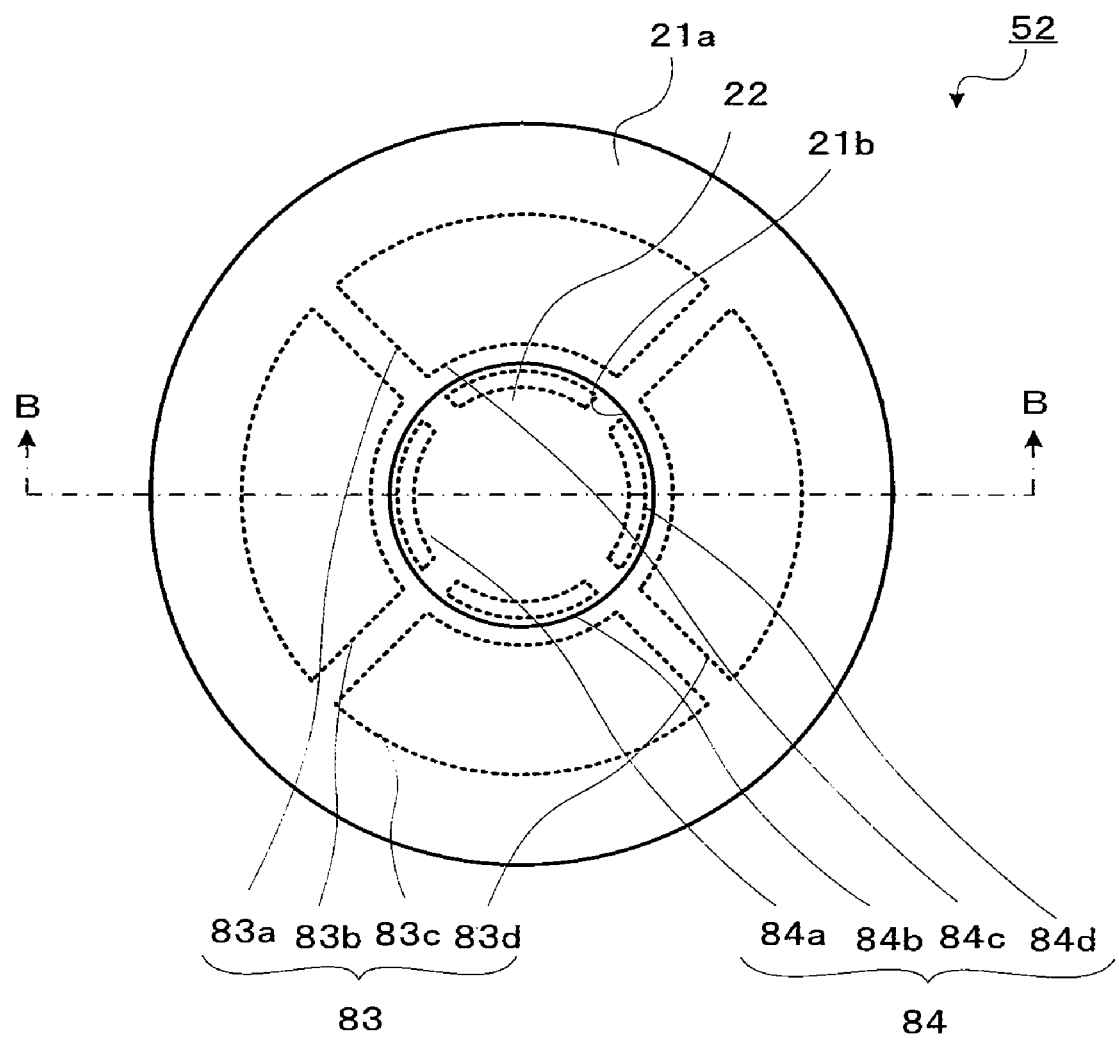
FIG. 6 is a plan view of an imaging device of the second embodiment of the invention.

The positive electrode 83 comprises four electrodes 83a to 83d, disposed symmetrically about a point on the central axis (optical axis), as shown in FIG. 6. In other words, the electrodes 83a to 83d have a shape formed by dividing the positive electrode 13 in FIG. 1 into four equal portions. These electrodes 83a to 83d are referred to collectively as the positive electrode 83. In addition, the positive electrode 83 is provided upon the planar portion 21c of the lens holder 21 to form a ring shape in the entirety thereof, as shown in FIG. 5. The positive electrode 83 comprises, for example, inorganic conducting materials such as carbon black, gold, silver, aluminum, and phosphor bronze, or organic conducting materials such as organic conducting polymers.

Corresponding to the electrodes 83a to 83d constituting the positive electrode 83, the negative electrode 84 comprises four electrodes 84a to 84d, disposed symmetrically about a point on the optical axis, as shown in FIG. 6. In other words, the electrodes 84a to 84d have a shape formed by dividing the negative electrode 14 in FIG. 1 into four equal portions. These electrodes 84a to 84d are referred to collectively as the negative electrode 84. The electrodes 84a to 84d are formed on the inner surface of the aperture 21d formed on the planar portion 21c of the lens holder 21, corresponding to the disposed positions of the electrodes 83a to 83d. The negative electrode 84 comprises, for example, inorganic conducting materials such as carbon black, gold, silver, aluminum, and phosphor bronze, or organic conducting materials such as organic conducting polymers.

The four electrodes 83a to 83d constituting the positive electrode 83 and the four electrodes 84a to 84d constituting the negative electrode 84 are respectively connected to a controller 112. The controller 112 applies a voltage Va+ to the electrode 83a, a voltage Va− to the electrode 84a, and similarly applies the voltages Vb+, Vc+, and Vd+ to the electrodes 83b to 83d, as well as the voltages Vb−, Vc−, and Vd− to the electrodes 84b to 84d. Each voltage is independently controllable. In other words, the controller 112 independently controls the voltages applied between the electrodes 83a and 84a, between the electrodes 83b and 84b, between the electrodes 83c and 84c, and between the electrodes 83d and 84d.

In the variable focal length lens 80 having the above configuration, an identical first voltage is mutually applied to the electrodes 83a to 83d, and an identical second voltage is mutually applied to the electrodes 84a to 84d. In so doing, the lens 11 can be radially stretched in a nearly uniform manner over the entire circumference thereof. In so doing, the curvature of the lens 11 changes, and thus the focal length changes.

Furthermore, in the variable focal length lens 80 of the second embodiment, the controller 112 may set voltage values such that the voltage Va applied between the electrode 83a and the electrode 84a, the voltage Vb applied between the electrode 83b and the electrode 84b, the voltage Vc applied between the electrode 83c and the electrode 84c, and the voltage Vd applied between the electrode 83d and the electrode 84d may be mutually different voltages.

Consequently, for example in the case where the lens 11 includes errors (lens distortions) with respect to the optical axis, it is possible to adjust the deformation of the first layer 11a and the second layer 11b by setting, for example, a value for the voltage Va applied between the electrode 83a and the electrode 84a that is different from the other voltages Vb to Vd, thereby it is also possible to correct (compensate for) these errors.

In addition, since errors by applied voltages may be corrected with dividing each of the electrodes symmetrically about the central axis, the work to secure lens while aligning it with the optical axis when installing the lens that was necessary in the case where the positive electrode is formed in a ring shape, such as the first embodiment may be omitted.

In addition, even in the hypothetical case where the lens is secured by alignment with the optical axis in the rest state, there has been the possibility of the problem of large individual image quality differences when the variable focal length lens is operated, as a result of imperfections in the shape of the formed lens or minute differences with the electrode boundary. However, as a result of forming each electrode divided as in the second embodiment, the voltage applied between each of the electrodes can be adjusted to compensate for deviation from the optical axis, even for cases wherein the lens is not strictly aligned with the optical axis during lens installation. Consequently, by utilizing the variable focal length lens 80 of the second embodiment adjusting functions adapted for individual lenses are provided, the allowable value for individual differences (shapes, etc.) during fabrication of variable focal length lenses is increased, and fabrication costs can be lowered.

Typical variable focal length lenses have focal adjusting functions along the optical axis (z axis) only, but the variable focal length lens 80 of the second embodiment is able to finely adjust the focus with respect to the plane perpendicular to the optical axis (i.e., the xy axes). Consequently, even for the case of, for example, a security camera or similar camera that is stationary, a desired image of a subject can be captured by adjusting the lens.

Third Embodiment

Figure 7:
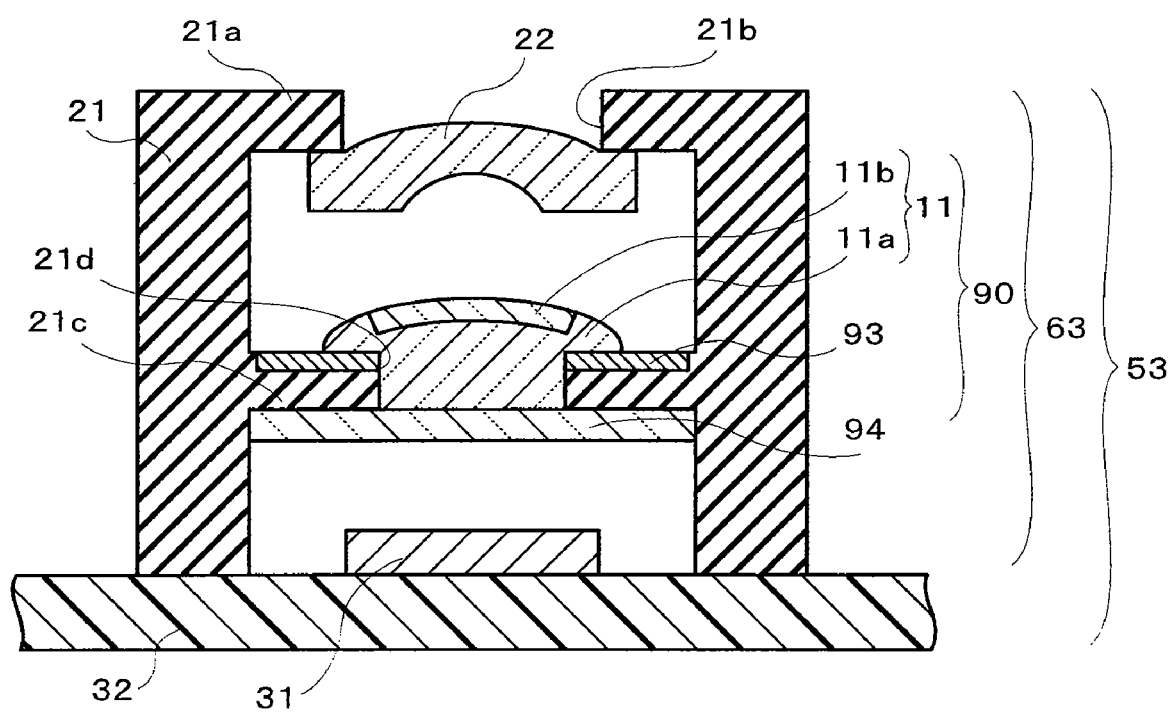
FIG. 7 is a cross-sectional view (taken along the dashed line C to C in FIG. 8) of an imaging device of the third embodiment of the invention.
Figure 8:
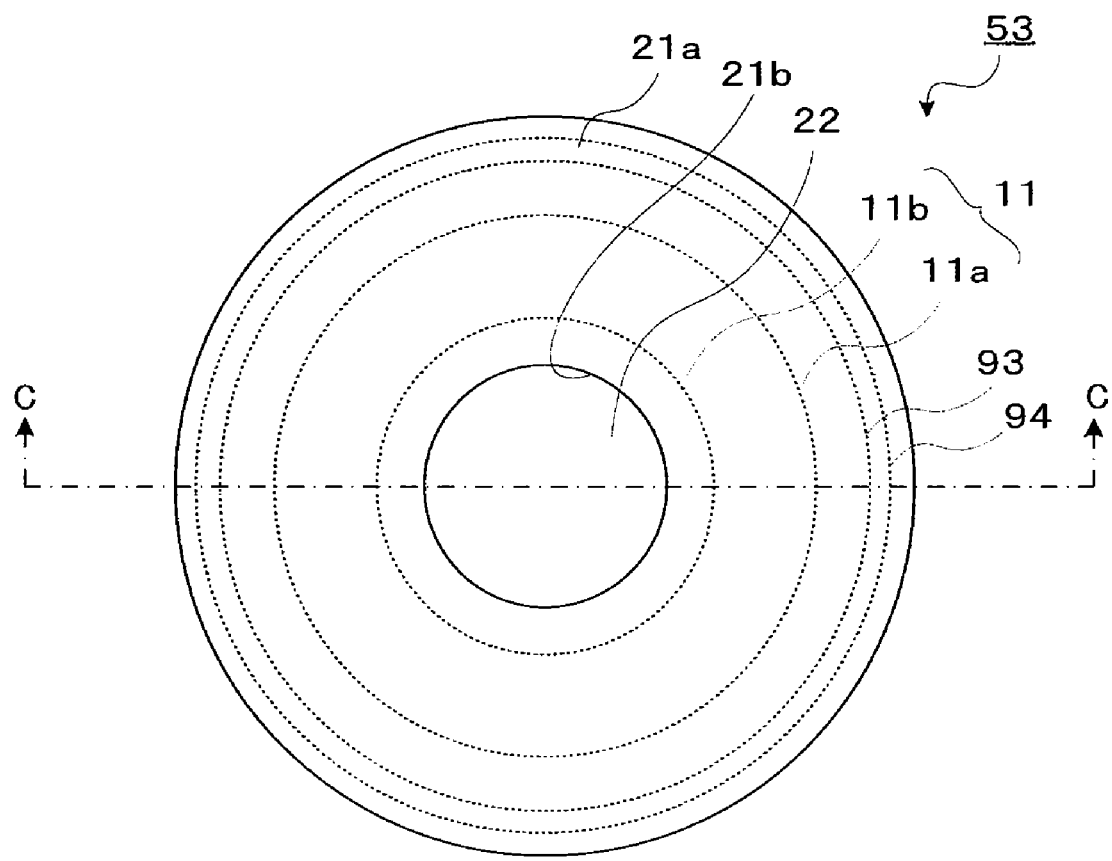
FIG. 8 is a plan view of an imaging device of the third embodiment of the invention.

An imaging device 53 of the third embodiment of the present invention is shown in FIGS. 7 and 8. The variable focal length lens 90 of the third embodiment differs from the variable focal length lenses 10 and 80 described above in the region where the negative electrode is formed. Portions common to the above-described embodiments will be referred to using identical reference numbers.

As shown in FIGS. 7 and 8, the imaging device 53 is provided with a focal length adjusting device 63, an imaging sensor 31, and a printed circuit board 32. The focal length adjusting device 63 is provided with a variable focal length lens 90, a lens holder 21, and a lens 22.

The variable focal length lens 90 comprises a lens 11, a positive electrode 93, and a negative electrode 94. The variable focal length lens 90 is provided on the planar portion 21c of the lens holder 21, as shown in FIG. 7.

Similarly to the first embodiment, the second layer 11b and the first layer 11a constituting the lens 11 are formed from polyvinyl chloride to which has been added a plasticizer. The second layer 11b is formed harder than the first layer 11a to a set degree, and additionally is formed so as to cover at least a light transmission region upon the first layer 11a. Thus, the second layer 11b determines the curvature of the lens 11. Moreover, in the third embodiment, the first layer 11a is formed packed into the aperture 21d of the planar portion 21c of the lens holder 21 so as to contact the negative electrode 94, the negative electrode 94 being formed on the surface that faces the printed circuit board 32 (the bottom surface) of the planar portion 21c.

The positive electrode 93 may be formed, from inorganic conducting materials such as carbon black, gold, silver, aluminum, and phosphor bronze, or from organic conducting materials such as organic conducting polymers, etc., for example phosphor bronze plate. The positive electrode 93 is formed so as to cover the top surface of the planar portion 21c of the lens holder 21.

The negative electrode 94 is formed from a conducting material having light transmission properties, such as ITO (indium tin oxide), for example. As shown in FIG. 7, the negative electrode 94 is provided upon the bottom surface of the planar portion 21c so as to seal the aperture 21d.

Since the variable focal length lens 90 of the third embodiment is provided with a lens 11 comprising a first layer 11a and a second layer 11b in the same manner as the first embodiment, the curvature thereof can be easily controlled. Furthermore, in the third embodiment, since the negative electrode 94 is formed below the first layer 11a constituting the variable focal length lens 90, the bottom surface of the variable focal length lens 90 is made uniform, and the occurrence of optical image distortion is decreased. In addition, the negative electrode 94 is configured to be formed on the inner peripheral surface of the aperture 21d of the planar portion 21c by forming the negative electrode 94 on the bottom surface of the planar portion 21c, and for this reason, the negative electrode 94 is easily formed.

Figure 9:
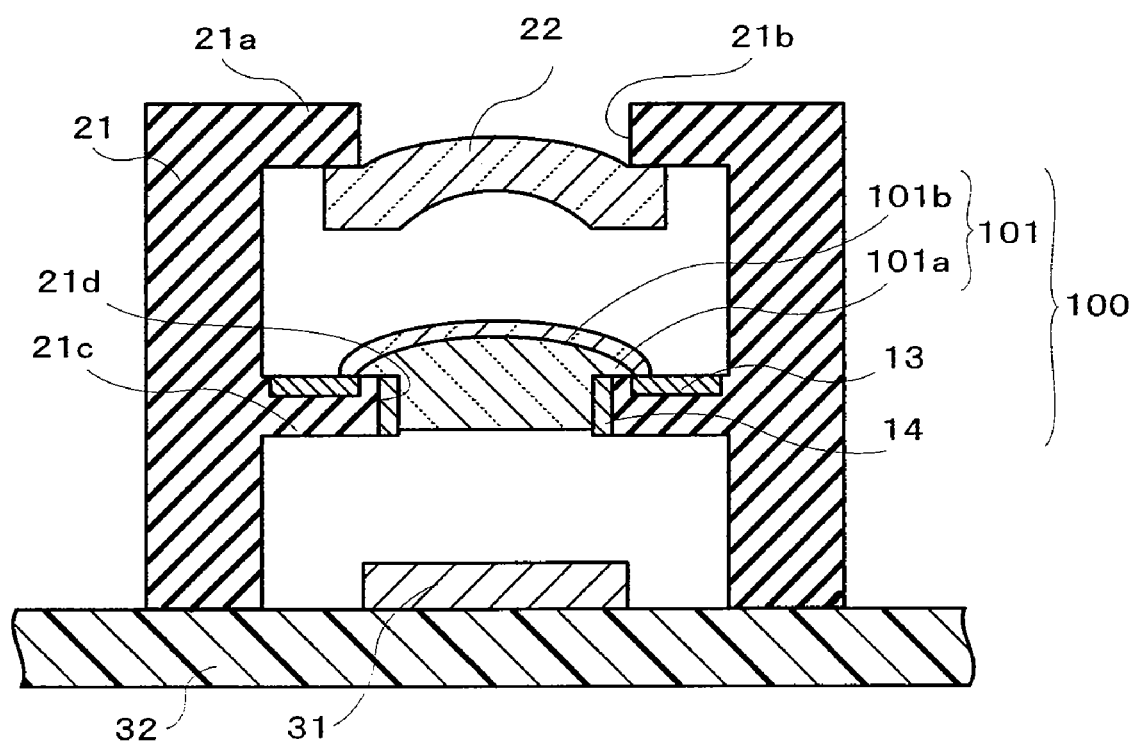
FIG. 9 is a cross-sectional view showing a modified configuration of an embodiment of the invention.

The present invention is not limited to the foregoing embodiments, and may be subjected to various alterations or modifications thereof. For example, in each of the embodiments described above, a case was described by way of example wherein the second layer 11b of the lens 11 is formed so as to cover at least a light transmission region of the first layer 11a. However, the present invention is not limited to the above, and a second layer 101b may be formed so as to cover the entirety of a first layer 101a, as shown in a variable focal length lens 100 in FIG. 9.

In addition, in the second embodiment described above, a case was described by way of example wherein the positive electrode 83 and negative electrode 84 are respectively divided into four portions symmetrically about the central axis. However, the number of divided portions is not limited to four, and may be an arbitrary integer equal to or greater than two. In addition, the configuration in the second embodiment wherein the electrodes are formed divided may also be applied to the third embodiment.

In addition, the voltage applied to the variable focal length lens 10 is not limited to one step. The applied voltage may be varied continuously (in an analog manner), or may be varied in multiple steps (in a stepped manner). If such a voltage application method is adopted, the curvature of the variable focal length lens 10 can be varied in multiple steps or in a step-less, continuous manner.

In addition, in the first embodiment, a configuration was described by way of example wherein the positive electrode 13 is formed upon the planar portion 21c of the lens holder 21, the negative electrode 14 is formed upon the inner peripheral surface of the aperture 21d of the planar portion 21c, and wherein the first layer 11a and the second layer 11b deform radially outward. However, the invention is not limited to the above, and the region where the positive electrode 13 and the negative electrode 14 or the direction in which the first layer 11a and the second layer 11b are formed may be arbitrarily modified. For example, a configuration may be selected wherein the negative electrode 14 is formed upon the planar portion 21c, the positive electrode 13 is formed farther radially inward than the negative electrode 14, and wherein the first layer 11a and the second layer 11b deform radially inward. In addition, a configuration may be selected wherein the positive electrode 13 and the negative electrode 14 are formed upon the same surface of the planar portion 21c.

In each of the foregoing embodiments, a case was described by way of example wherein the second layer 11b is formed only on the light incident side (the side facing the lens 22). However, the invention is not limited to the above, and a configuration may be selected wherein a layer, similar to the second layer 11b, that is harder than the first layer 11a is formed on the surface that faces the imaging sensor 31, and wherein the curvature on both sides of the variable focal length lens 10 is changed.

In each of the foregoing embodiments, a case was described by way of example wherein polyvinyl chloride is used. However, materials other than polyvinyl chloride may also be used if such materials have the property of deforming according to a voltage applied between a positive electrode and a negative electrode.

In addition, in each of the foregoing embodiments, a configuration was described by way of example wherein an optical image of a subject is formed using two lenses. However, the invention is not limited to the above, and for example a configuration using three lenses may also be selected. In addition, the position of the variable focal length lens may be arbitrarily selected, and a configuration wherein a lens is provided between the variable focal length lens and the imaging sensor may also be selected.

The number of layers constituting the lens was described to be two, but three or more layers may also be configured.

Figure 10:
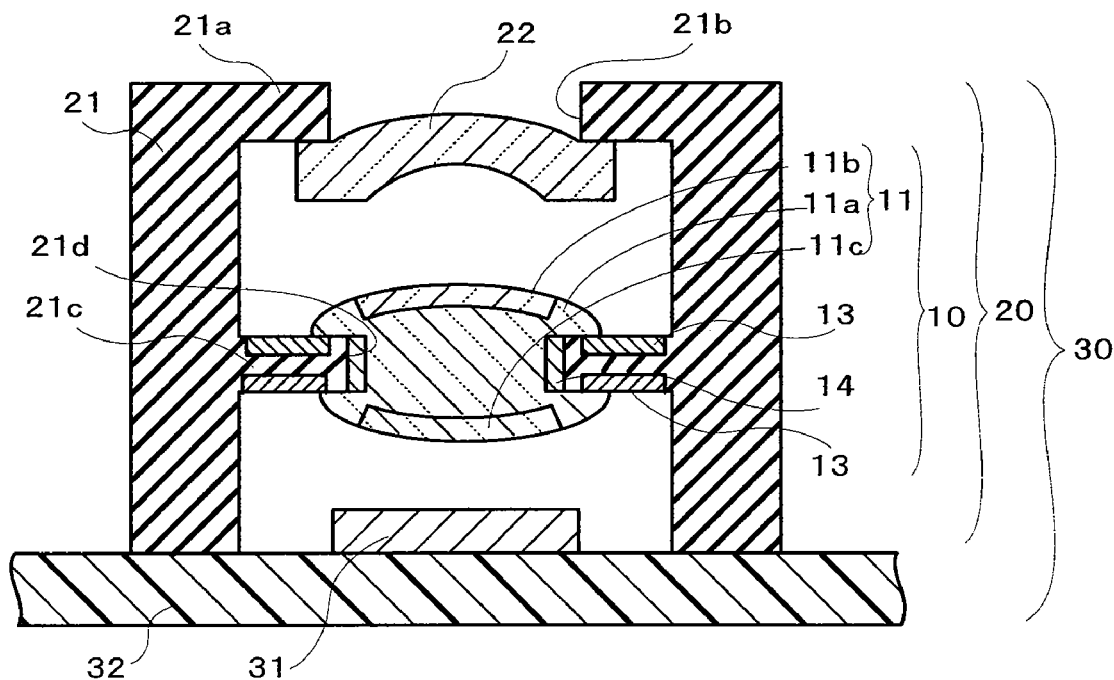
FIG. 10 is a cross-sectional view showing a modified configuration of an embodiment of the invention, wherein the lens comprises three layers.
Figure 10:
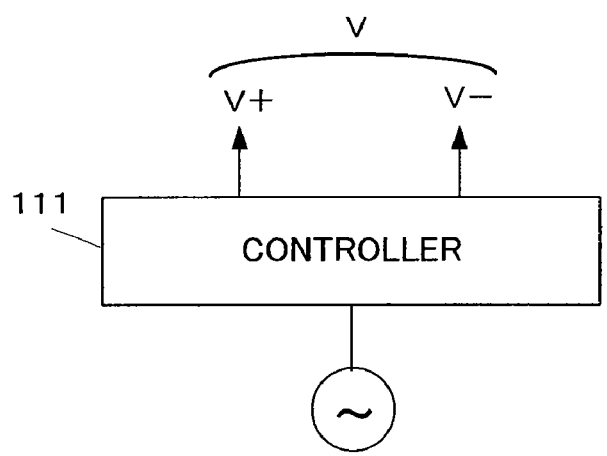

In addition, an example was given wherein the curvature of only one side is varied, but both sides may also be varied. In this case, the configuration for controlling the curvature of one side of the lens shown in FIGS. 1 to 9 may, for example, be provided for the bottom side thereof, as shown in FIG. 10. For example, a second positive electrode having a similar configuration to the positive electrode 13 (83) shown in FIG. 1 or 5 may be provided on the bottom side of the planar portion 21c, and a portion of the first layer 11a may be made to contact this positive electrode 13 (83). In addition, on the bottom side of the first layer 11a, a third layer 11c may be provided that is harder than the first layer 11a for determining the curvature of the bottom side of the lens.

In addition, in the first through the third embodiments, a case was described wherein the lens shape is that of a convex lens, but the lens shape may also be that of a concave lens. In this case, the components determining the curvature of the lens of the embodiment of the invention are, from among the layers 11a, 11b, and 11c formed from a polymer, the second layer 11b and the third layer 11c, which are provided on the outer surface of and formed harder than the first layer 11a.

This application is based on Japanese Patent Application No. 2005-241863, filed in the Japan Patent Office on Aug. 23, 2005, the content of which is hereby incorporated by reference. In addition, this application includes portions common to the technology disclosed in Japanese Patent Application No. 2005-104630, filed in the Japan Patent Office on Mar. 31, 2005. However, this application does not disclose the construction of a lens from a plurality of layers. The content of this application is also hereby incorporated by reference into the present application.

INDUSTRIAL APPLICABILITY

A variable focal length lens is provided that varies curvature by deforming according to an applied voltage. In addition, with the use of the variable focal length lens, a focal length adjusting that is of simple construction and miniaturizable is provided, as well as an imaging device using the same.

The invention claimed is:

1. An apparatus, comprising:
a variable focal length lens, the lens having a first layer formed from a polymer, and a second layer, formed from a polymer, that contacts the first layer in at least a light transmission region of the first layer, the curvature of the second layer determining the curvature of the lens;
a first electrode, contacting the first layer; and
a second electrode, contacting the first layer;
wherein the first electrode is ring-shaped and the second electrode is ring-shaped or disc-shaped;
wherein when a voltage is applied between the first electrode and the second electrode, the first layer and the second layer respectively deform so as to be drawn toward the first electrode, thereby varying the curvature of the lens.

2. The apparatus according to claim 1 wherein the second layer is harder than the first layer.

3. The apparatus according to claim 1, wherein both the first layer and the second layer have mutually different hardnesses as a result of being mutually different in at least one of the type of polymer, the added quantity of plasticizer, and the type of plasticizer.

4. The apparatus according to claim 1, wherein at least one of the electrodes comprises a plurality of electrodes disposed symmetrically about an optical axis of the lens.

5. The apparatus according to claim 1, wherein the second layer covers the entirety of a light incident side of the first layer.

6. The apparatus of claim 1, wherein each of the electrodes contacts the first layer at least at one region that is away from and not in contact with the second layer.

7. The apparatus of claim 1, wherein each of the electrodes contacts the first layer only at regions that are away from and not in contact with the second layer.

8. The apparatus of claim 1, wherein each of the electrodes contacts the first layer at least at one non-light transmission region of the first layer.

9. The apparatus of claim 1, wherein each of the electrodes contacts the first layer only at non-light transmission regions of the first layer.

10. The apparatus of claim 1, wherein the shapes of the electrodes do not affect the curvature of the lens.

11. A focal length adjusting device, comprising:
a lens, the lens having a first layer formed from a polymer, and a second layer formed from a polymer that contacts the first layer in at least a light transmission region of the first layer, the curvature of the second layer determining the curvature of the lens; a lens holder that holds the lens;

a first electrode contacting the first layer of the lens and disposed in or on the lens holder; and a second electrode contacting the first layer of the lens and disposed in or on the lens holder;

wherein the first electrode is ring-shaped and the second electrode is ring-shaped or disc-shaped;

wherein when a voltage is applied between the first electrode and the second electrode, the first layer and the second layer respectively deform so as to be drawn toward the first electrode, thereby varying the curvature of the lens, and thus changing the focal length.

12. The focal length adjusting device according to claim 11, wherein the lens holder is provided with a planar portion having an aperture, and wherein the lens is held by the planar portion.

13. The focal length adjusting device according to claim 12, wherein the aperture is substantially cylindrical, wherein the first electrode is ring-shaped and disposed upon the planar portion around the aperture, and wherein the second electrode is disposed on an inner peripheral surface of the aperture.

14. The focal length adjusting device according to claim 12, wherein:

the first electrode is formed on a first side of the planar portion, the second electrode is formed on a second side of the planar portion so as to cover the aperture of the planar portion, and the second electrode is formed from a material having light transmission properties.

15. The focal length adjusting device according to claim 11, at least one of the electrodes comprises a plurality of electrodes disposed symmetrically about an optical axis of the lens.

16. An imaging device, comprising:

the focal length adjusting device according to claim 11;

a board upon which the focal length adjusting device is provided; and an imaging sensor disposed upon the board.

17. A variable focal length lens, comprising: a lens, the lens having a first layer formed from a polymer, and a second layer formed from a polymer, the second layer being provided in at least a light transmission region of the first layer, the curvature of the second layer determining the curvature of the lens;

a holding portion, the holding portion holding the lens in a direction perpendicular to an optical axis of the lens, and in a direction parallel to the optical axis of the lens; a first electrode, contacting the first layer; and a second electrode, contacting the first layer;

wherein the first electrode is ring-shaped and the second electrode is ring-shaped or disc-shaped;

wherein when a voltage is applied between the first electrode and the second electrode, the first layer deforms so as to expand radially outward along the first electrode, and the second layer deforms so as to expand radially outward and to be drawn toward the first electrode, thereby varying the curvature of the lens.

18. A focal length adjusting device, comprising: a lens, the lens having a first layer formed from a polymer, and a second layer formed from a polymer, the second layer being provided in at least a light transmission region of the first layer, the curvature of the second layer determining the curvature of the lens;

a lens holder, the lens holder comprising a planar portion that holds the lens, and an aperture disposed in the planar portion, wherein the inner peripheral surface of the aperture holds the lens;

a first electrode contacting the lens and disposed on the planar portion of the lens holder; and a second electrode contacting the lens and disposed in the aperture of the lens holder;

wherein the first electrode and the second electrode contact at least the first layer of the lens, and wherein the first electrode is ring-shaped and the second electrode is ring-shaped or disc-shaped; and wherein; when a voltage is applied between the first electrode and the second electrode, the first layer and the second layer respectively deform along the planar portion of the lens holder so as to be drawn toward the first electrode, thereby varying the curvature of the lens, and thus changing the focal length.

* * * * *